United States Patent
Borsarelli et al.

(10) Patent No.: US 6,948,339 B2
(45) Date of Patent: Sep. 27, 2005

(54) PUNCH ASSEMBLY FOR PRODUCING HOLLOW GLASS ARTICLES IN A MOLD

(75) Inventors: Gianclaudio Borsarelli, Cuneo (IT); Lorenzo Armando, Cuneo (IT); Bruno Viada, Madonna Delle Grazie (IT); Carlo Sesia, Cuneo (IT)

(73) Assignee: Bottero S.p.A., Cuneo (IT)

(*) Notice: Subject to any disclaimer, the term of this patent is extended or adjusted under 35 U.S.C. 154(b) by 471 days.

(21) Appl. No.: 10/101,432

(22) Filed: Mar. 18, 2002

(65) Prior Publication Data

US 2002/0144519 A1 Oct. 10, 2002

(30) Foreign Application Priority Data

Mar. 23, 2001 (IT) .................................... TO2001A0281

(51) Int. Cl.[7] .............................................. C03B 11/05
(52) U.S. Cl. .............................. 65/362; 65/314; 65/318
(58) Field of Search .......................... 65/362, 314, 318, 65/322

(56) References Cited

U.S. PATENT DOCUMENTS

| | | | | |
|---|---|---|---|---|
| 2,102,357 A | * | 12/1937 | Dichter | ........................ 65/79 |
| 3,593,366 A | * | 7/1971 | Smith | ........................ 425/78 |
| 4,260,346 A | * | 4/1981 | Anderson et al. | ............. 425/78 |
| 4,662,923 A | * | 5/1987 | Vajda et al. | ............... 65/29.15 |
| 5,451,288 A | * | 9/1995 | Smith et al. | ................ 156/359 |
| 5,644,227 A | * | 7/1997 | Geisel | ................... 324/207.24 |
| 5,707,414 A | * | 1/1998 | Leidy | .......................... 65/158 |
| 6,170,296 B1 | * | 1/2001 | Kawachi | ..................... 65/318 |
| 6,311,597 B1 | * | 11/2001 | Schroth et al. | ............... 83/531 |
| 6,397,635 B1 | * | 6/2002 | Sasso et al. | .................. 65/160 |
| 6,701,748 B1 | * | 3/2004 | Hartman et al. | ........... 65/29.18 |

FOREIGN PATENT DOCUMENTS

| | | | | |
|---|---|---|---|---|
| EP | 615958 A1 | * | 9/1994 | .......... C03B/00/00 |
| EP | 789004 A2 | * | 8/1997 | .......... C03B/9/193 |
| EP | 0919525 A2 | | 6/1999 | |

* cited by examiner

Primary Examiner—Steven P. Griffin
Assistant Examiner—Carlos Lopez
(74) Attorney, Agent, or Firm—Sheridan Ross PC

(57) ABSTRACT

A punch assembly for producing hollow glass articles in a mold has a punch member, which is moved to and from the mold along a straight axis by an electric motor positioned eccentrically with respect to the straight axis and connected to the punch member by a rotary-to-linear motion conversion assembly, and a releasable angular connecting assembly interposed between the motor and the motion conversion assembly.

19 Claims, 4 Drawing Sheets

PUNCH ASSEMBLY FOR PRODUCING HOLLOW GLASS ARTICLES IN A MOLD

The present invention relates to a punch assembly for producing hollow glass articles in a mold.

BACKGROUND OF THE INVENTION

To produce a hollow glass article, a gob of molten glass is deposited inside a mold, and at least a preliminary outwardly open cavity is formed in the glass gob, normally by means of a punch assembly comprising a punch member, which is inserted inside the mold and the molten glass gob, and a normally pneumatic or hydraulic actuating device for moving the punch member to and from the mold in a vertical direction.

Though widely used, pneumatic or hydraulic actuating devices have various drawbacks, all related to the use of pressurized operating fluid. At present, such drawbacks are at least partly solved by the solution described in European Patent Application n. EP 0 789 004, which relates to an electric punch assembly, in which the punch member is driven by a rotary electric motor aligned and coaxial with said vertical direction, and connected to the punch member by a screw-nut screw transmission.

While solving the operating fluid problems of former devices, the above electric assembly is of only limited success by only applying to certain types of molding machines, and, in particular, by calling for major alterations to existing machines which are not always possible.

The reason for this substantially lies in the considerable axial size, i.e. measured in the traveling direction of the punch member, of the above electric assembly, which therefore cannot be inserted in the space available on existing molding machines, which, as is known, is defined at the top by the mold and at the bottom by the mold opening/closing assembly.

The electric actuating assembly of the above patent application is also relatively complex to produce and difficult to assemble, thus complicating not only routine maintenance but even straightforward replacement of both the electric motor and the screw-nut screw transmission which, with wear, inevitably introduces slack in the gearing between the electric motor and punch member. In some cases, the motor and the screw-nut screw transmission reach the end of their working lives in times which may differ widely—mainly on account of the motor being located adjacent to the mold, inside a closed chamber, and therefore in a high-temperature environment—so that they must be replaceable independently and quickly without having to dismantle the whole assembly, which conditions are not met by the known electric-motor punch assembly.

Moreover, known electric actuating assemblies are difficult to apply in the case of multiple-mold sections, i.e. when each molding section comprises two or more adjacent molds for producing two or more articles simultaneously. In such cases, a number of adjacent punch assemblies—one for each mold—must be set up and so positioned that the distance between the axes of each two adjacent molds is exactly the same as that between the traveling directions of the relative punches. Given the considerable transverse dimensions of known punch assemblies and the need to align the motor, the motion conversion assembly and the punch member, such an arrangement is not always possible, so that known punch assemblies are rejected even at the design stage.

SUMMARY OF THE INVENTION

It is an object of the present invention to provide a punch assembly designed to provide a straightforward, low-cost solution to the above problems.

According to the present invention, there is provided a punch assembly for producing hollow glass articles in a mold; the assembly comprising a punch member which is inserted inside a mass of molten glass in the mold to form an outwardly open cavity in the mass of glass; and an electric motor for moving the punch member to and from the mold along a substantially vertical straight axis; characterized in that said electric motor extends eccentrically with respect to said straight axis.

BRIEF DESCRIPTION OF THE DRAWINGS

A non-limiting embodiment of the invention will be described by way of example with reference to the accompanying drawings, in which.

DETAILED DESCRIPTION OF THE INVENTION

Figure 1:
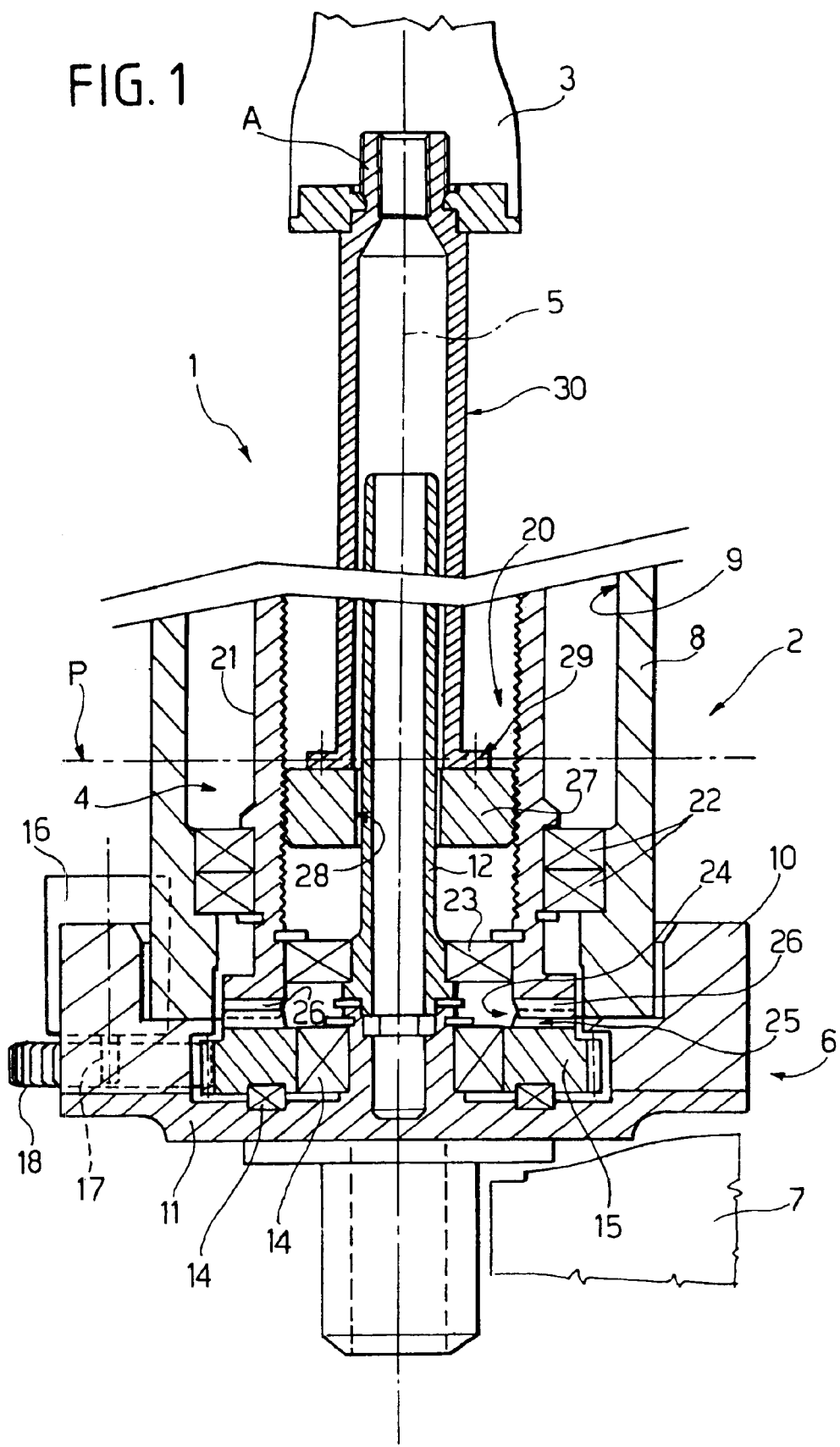
FIG. 1 shows a section of a first preferred embodiment of the punch assembly according to the present invention.

Number 1 in FIG. 1 indicates as a whole a punch assembly for producing hollow glass articles in a mold (not shown). Assembly 1 comprises a fastening frame 2 which is fitted integrally to a fixed structure (not shown) of a molding machine (not shown); a known punch member 3, not described in detail, which cooperates with a mass of molten glass in the mold to form an outwardly open cavity in the mass; and an actuating device 4 connected to fastening frame 2 to move punch member 3 cyclically back and forth to and from the mold along a vertical axis 5.

As shown particularly in FIG. 1, fastening frame 2 comprises a cup-shaped bottom body 6 located over a known mold opening/closing device 7; and a tubular top body 8 extending partly inside cup-shaped body 6, and defining, with cup-shaped body 6, a cavity 9. Cup-shaped body 6 in turn comprises an annular lateral wall 10 connected to tubular top body 8; and a bottom wall 11 connected integrally to lateral wall 10, and from which a hollow hub 12 extends upwards, coaxially with axis 5, and is connected in known manner to a pressurized air source. A gear 15, coaxial with axis 5, is connected to a bottom portion of hub 12 and to wall 11 by means of two bearings 14, and forms part of device 4, which also comprises a rotary motor 16. Motor 16 extends parallel to and eccentrically with respect to axis 5, is located adjacent to bottom wall 11, and is fitted, on its output shaft 17 facing bottom wall 11, with a gear 18, which either meshes directly with gear 15, as in the example shown, or is connected to gear 15 by a toothed drive belt or equivalent transmission means.

With reference to FIG. 1, device 4 also comprises a screw-nut screw rotary-to-linear motion conversion assembly 20, which extends over gear 15, inside tubular body 8, surrounds hub 12, and in turn comprises a tubular nut screw 21 connected to tubular body 8 and to hub 12 in rotary, axially-fixed manner by respective bearings 22 and 23, and to gear 15 by an angular coupling assembly 24 having face teeth and which connects nut screw 21 to gear 15 in a fixed angular position, and enables nut screw 21 to be disconnected from gear 15 by simply being withdrawn along axis 5. More specifically, coupling assembly 24 comprises two or more retaining seats 25 formed on gear 15, and, for each seat 25, a respective axial tooth 26 projecting from nut screw 21 and positively engaging respective seat 25, i.e. with no angular clearance.

Alternatively, in a variation not shown, the coupling assembly is a splined or serrated shaft or key type.

Nut screw 21 houses a hollow screw 27, which is connected to nut screw 21 and has a central hole 28 engaged radially loosely by hub 12. Screw 27 is connected integrally to a bottom end portion 29 of a hollow supporting body 30, which extends upwards, coaxially with axis 5, is engaged loosely by hub 12, and terminates with a known top fastening portion A for punch member 3. Conveniently, motor 16 extends entirely beneath a horizontal plane P through bottom end portion 29 of body 30, regardless of the axial position of body 30.

Figure 2:
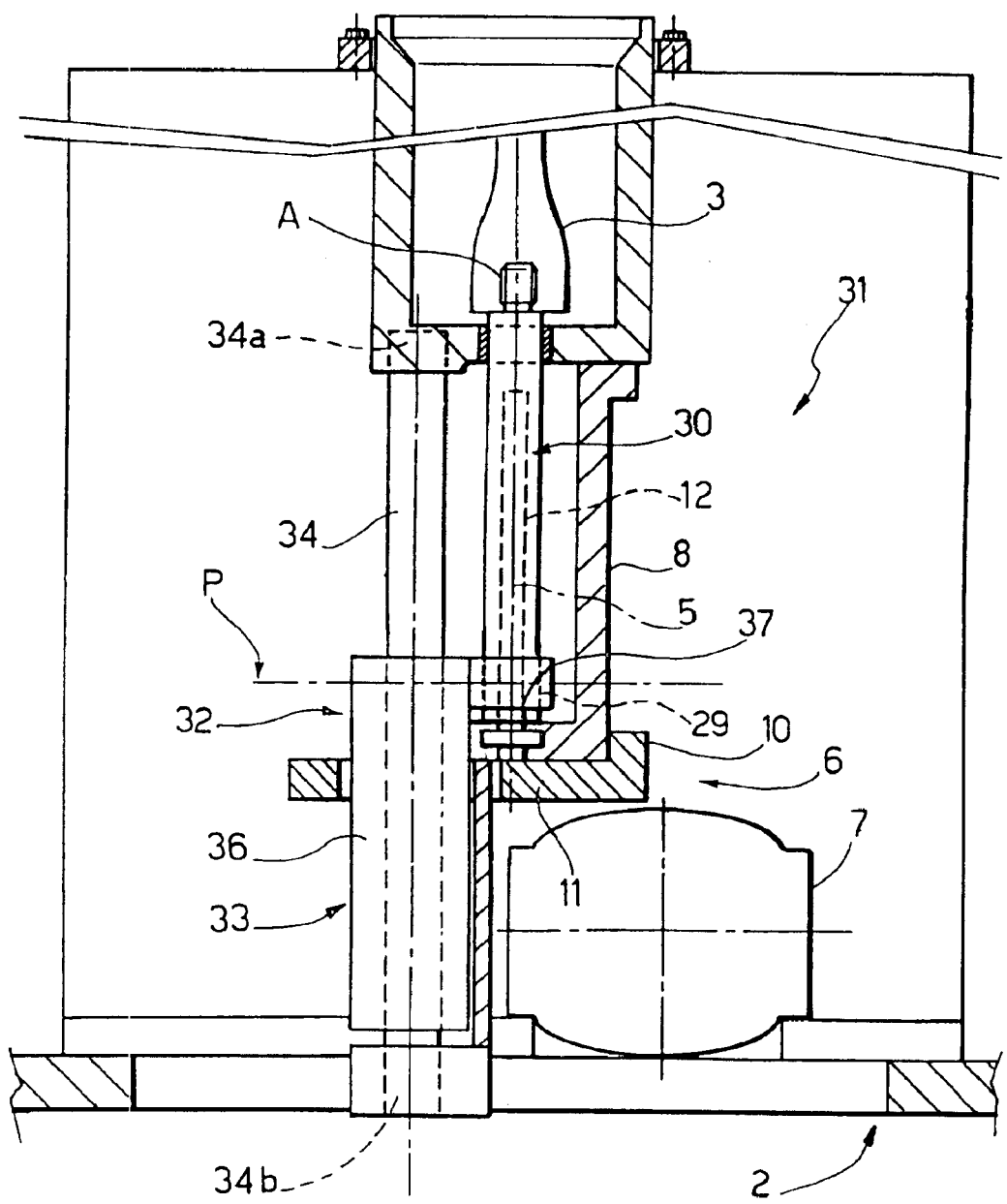
FIG. 2 shows a partial section of a second preferred embodiment of the punch assembly according to the present invention.

The FIG. 2 embodiment relates to a punch assembly 31 similar to assembly 1, and the component parts of which are indicated, where possible, using the same reference numbers as for the corresponding parts of assembly 1.

Assembly 31 comprises an actuating device 32 differing from device 4 by comprising a linear motor 33, which, like rotary motor 16, extends eccentrically with respect to axis 5, and comprises a fixed rodlike member 34 extending parallel to axis 5, spaced transversely apart from axis 5, and having opposite end portions 34a and 34b connected integrally to fastening frame 2. In the example shown, cup-shaped body 6 again extends over opening/closing device 7, and fixed member 34 extends facing device 7. Motor 33 comprises a sliding member 36 connected to fixed member 34, and a top appendix 37 of which is connected directly to bottom portion 29 of hollow body 30 so as to extend entirely beneath plane P regardless of the axial position of hollow body 30.

Figure 3:
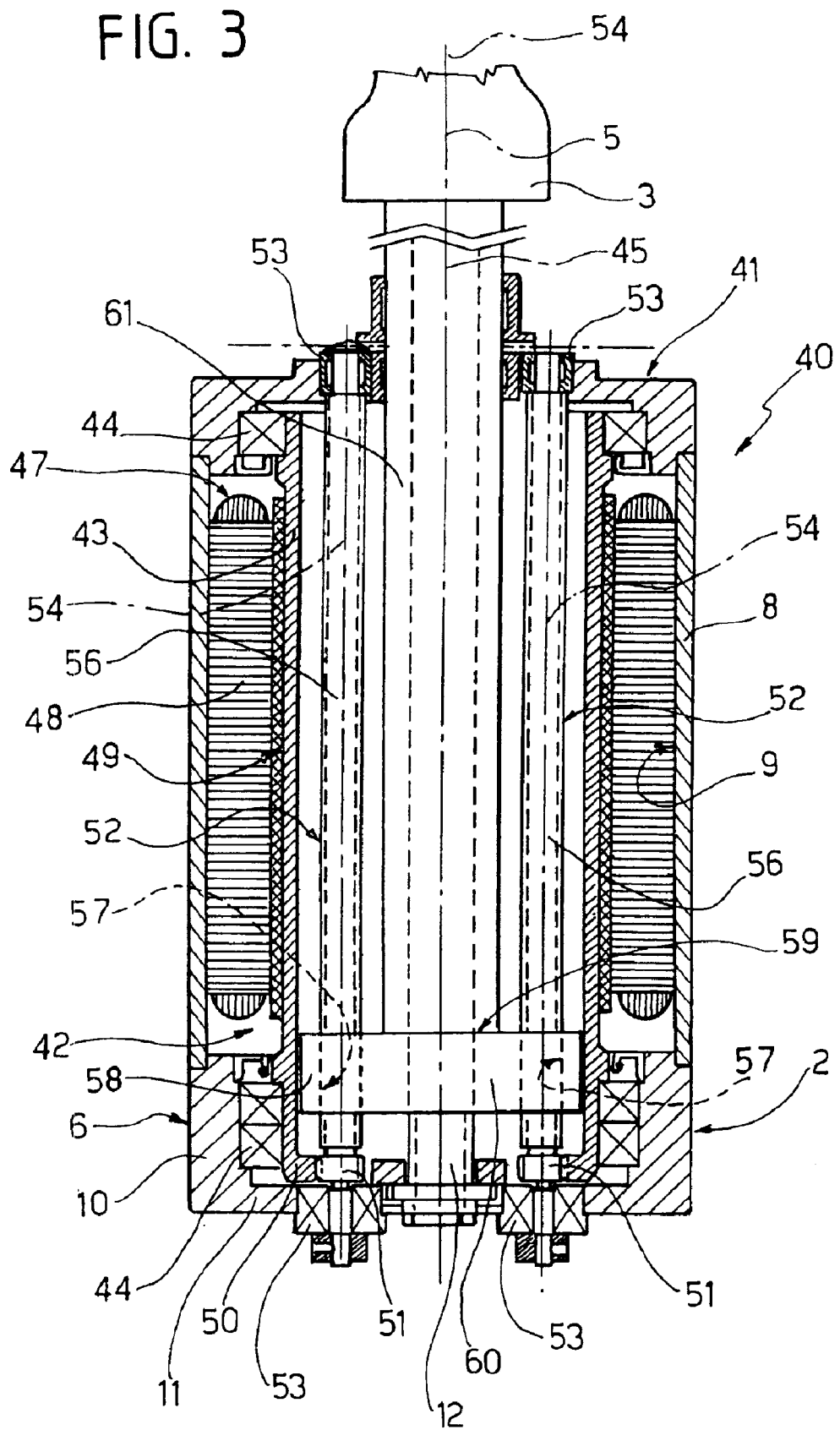
FIG. 3 shows a lateral section of a third preferred embodiment of the punch assembly according to the present invention.
Figure 4:
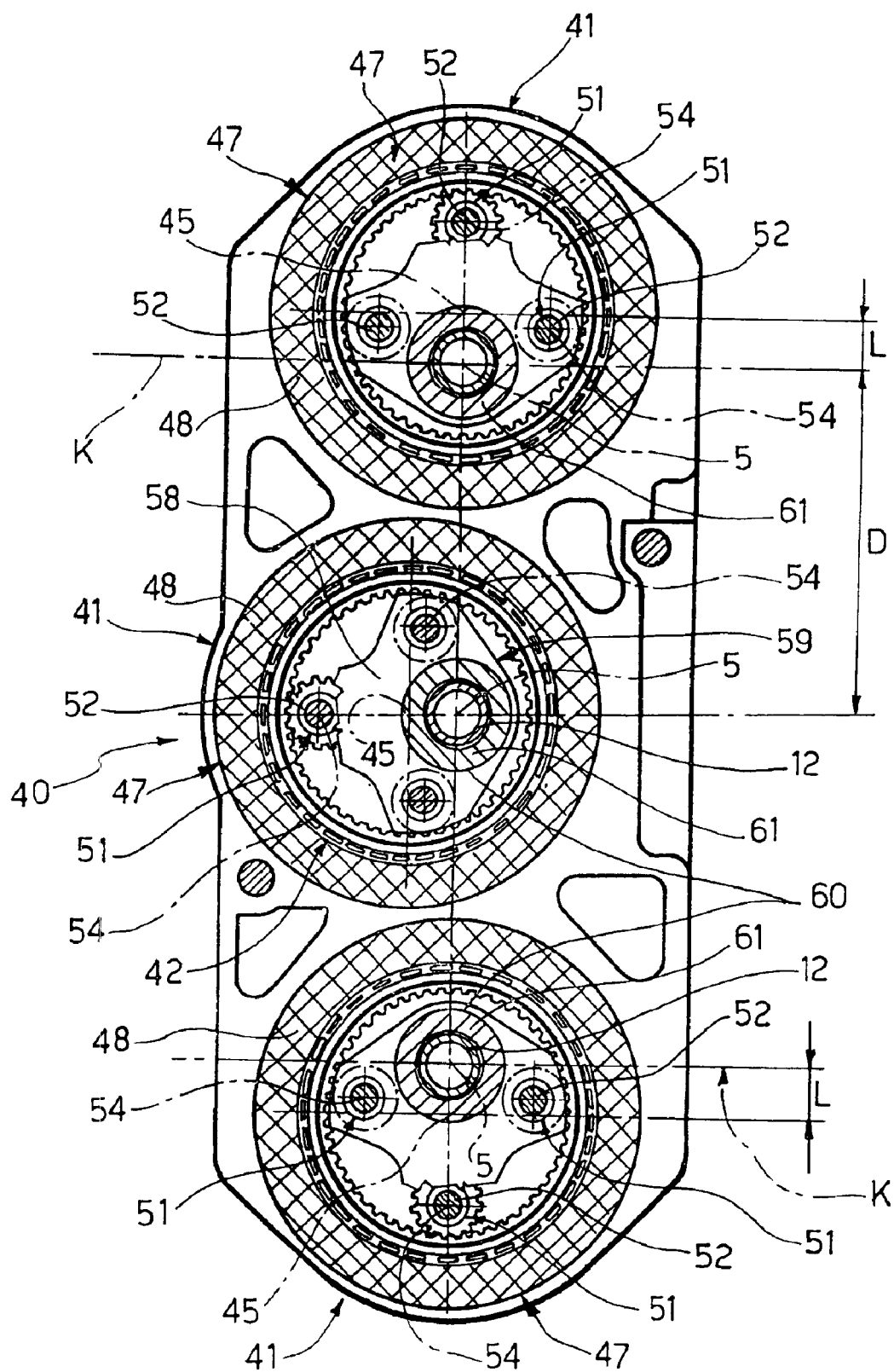
FIG. 4 shows a plan view, in section, of a set of three adjacent FIG. 3 punch assemblies for use in a three-mold molding section.

The FIGS. 3 and 4 embodiment relates to a set 40 of three identical, adjacent punch assemblies 41 rotated with respect to one another and for use with a molding section comprising three adjacent molds. Each assembly 41 is similar to assembly 1, and the component parts of which are indicated, where possible, using the same reference numbers as for the corresponding parts of assembly 1.

With reference to FIG. 3, each assembly 41 comprises an actuating device 42 differing from device 4 by comprising a powered tubular body 43, which extends inside cavity 9, houses hub 12, and is connected to frame 2 by bearings 44 to rotate in axially fixed manner about an axis 45 parallel to and eccentric with respect to axis 5. Body 43 is rotated about axis 45 by a rotary, quill-drive, electric motor 47 fitted, coaxially with axis 45, to an intermediate portion of tubular body 43, and having a fixed member 48 connected integrally to frame 2, and a movable member 49 (FIG. 3) connected integrally to body 43 and coaxial with axis 45. A bottom end portion of tubular body 43 is fitted integrally with a ring gear 50, the internal teeth of which mesh with three straight-toothed planet gears 51. Each gear 51 is fitted to an intermediate portion of a respective rod 52 extending inside tubular body 43 and having opposite end portions connected to frame 2 in rotary and axially fixed manner by means of respective bearings 53. Rods 52 have respective rotation axes 54, which extend parallel to and eccentrically with respect to axes 5 and 45, all on the same side of a vertical plane K (FIG. 4) through axis 5, and intersect the vertices of a triangle, one side of which is parallel to and spaced transversely from vertical plane K. Each rod 52 has an intermediate, externally threaded portion 56 engaging a respective threaded hole 57 formed in a portion 58 of a slide 59, which slides inside body 43 and has a further portion 60, which projects from portion 58, is fitted through with hub 12, and is fitted integrally with punch member 3 by means of a tubular upright 61 surrounding hub 12 and coaxial with vertical axis 5.

As will be clear from the above description, the eccentric arrangement of motor 16, 33, 47 with respect to the travel axis 5 of punch member 3 provides, above all, and as compared with known solutions, for achieving an extremely small, longitudinally compact actuating device, so that, unlike known assemblies, assemblies 1, 31, 41 can be applied to any existing machine, with no major alterations required, and, in particular, can be fitted to any existing machine featuring a mold opening/closing device beneath the punch assembly. Assemblies 1 and 41, in particular, are easy to produce and assemble, which not only greatly simplifies routine maintenance, but, above all, enables fast component part replacement and, in particular, replacement of the screw-nut screw motion conversion assembles without affecting the relative motors and vice versa. In other words, without removing the motors, the screw-nut screw assemblies can be removed by simply withdrawing them axially upwards, by virtue of longitudinal-toothed assembly 24 and the cylindrical-gear transmission being angular connecting assemblies permitting free relative axial movement.

Moreover, in the case of assemblies 1 and 31, locating the motor outside frame 2 and close to bottom wall 11 of frame 2 permits natural cooling of the motor with no need for complex, high-cost auxiliary cooling equipment.

In the case of assembly 41 and a number of adjacent molds, as in FIG. 4, the eccentricity L between axis 45 of motor 47 and vertical travel axis 5 of punch member 3 provides, with respect to said axes being coaxial, for reducing the distance between the vertical travel axes 5 of the various punch members 3 by simply rotating the assemblies with respect to one another, as shown clearly in FIG. 4, to adapt said distance to the distance D between the axes of the various molds, which are obviously coincident with axes 5.

Finally, in the case of assembly 41, the mechanical transmission 50, 51 between motor 47 and motion conversion assembly 56, 57 provides, as compared with known solutions, for reducing the length of tubular body 43, measured parallel to axis 45, to a length close to the required travel of punch member 3, and in particular for using a number of screw-nut screw assemblies with a much smaller thread diameter and pitch than the single central screw-nut screw assembly. More specifically, for a given transmitted action, using three screw-nut screw assemblies with threaded rods with a much smaller diameter than the screw of the single central screw-nut screw assembly provides for a triple reduction in the axial size of the assembly, as compared with using a single central screw-nut screw assembly. Using three screw-nut screw assemblies therefore makes the punch assembly even easier to insert inside the space between the molds and the mold opening/closing device 7 underneath.

Clearly, changes may be made to assemblies 1, 31, 41 as described herein without, however, departing from the scope of the present invention. In particular, different transmissions may be used for connecting the motors to punch members 3, and in particular for connecting and easily and independently dismantling the motors and respective motion conversion assemblies.

What is claimed is:

1. A punch assembly for producing hollow glass articles from a mass of molten glass placed in a mold, the articles having an outwardly open cavity, the punch assembly comprising:
   (a) a punch member for inserting in the mass of molten glass within the mold to form the cavity in the mass of glass;
   (b) a motor for moving the punch member to and from the mold along a substantially vertical straight axis, wherein said motor extends eccentrically with respect to said straight axis;
   (c) a transmission means interposed between said motor and said punch member said transmission means comprising rotary-to-linear motion conversion means:
   (d) a mechanical transmission interposed between said motor and said motion conversion means, said mechanical transmission comprising a ring gear driven by said motor and rotating about a rotation axis parallel to and spaced transversely apart from said straight axis;
   (e) a plurality of planet gears meshing with said ring gear and activating said motion conversion means, wherein said motion conversion means comprise, for each of said plurality of planet gears, a respective motion conversion assembly distinct from motion conversion assemblies of a remainder of said plurality of planet gears, and wherein each said planet gear is a straight-toothed gear and is fitted to a bottom end portion of a respective externally threaded rod parallel to said axes and connected to a relative nut screw;
   said punch member being carried by a slide sliding along said rotation axis;
   and said nut screws being connected integrally to said slide.

2. The punch assembly as claimed in claim 1, further comprising a fastening frame connected to a structure of a molding machine; said frame having a bottom portion at the opposite end to said punch member; and said motor being connected to said bottom portion.

3. The punch assembly as claimed in claim 1, further comprising angular connecting means interposed between said motion conversion means and a transmission gear of said transmission means.

4. The punch assembly as claimed in claim 3, wherein said angular connecting means are releasable, longitudinal-toothed connecting means.

5. The punch assembly as claimed in claim 3, wherein said transmission gear is coaxial with said straight axis; and wherein said angular connecting means comprise at least one axial retaining seat carried by one of either said transmission gear and said motion conversion means, and at least one projection carried by another of either said transmission gear and said motion conversion means and engaging said seat in an angular fixed, axially sliding manner.

6. The punch assembly as claimed in claim 1, wherein said rods extend eccentrically with respect to any one of said axes, and all on the same side of a vertical plane through said straight axis.

7. The punch assembly as claimed in claim 6, wherein said rods extend through respective vertices of a triangle, one side of which is parallel to and spaced apart from said vertical plane.

8. The punch assembly as claimed in claim 1, wherein said ring gear is an internal ring gear formed on a bottom end portion of a tubular body coaxial with said rotation axis and extending through said motor; said tubular body at least partly housing said rods and said slide.

9. A punch assembly for producing hollow glass articles from a mass of molten glass placed in a mold, the articles having an outwardly open cavity, the punch assembly comprising:
   (a) a punch member for inserting in the mass of molten glass within the mold, wherein the punch member forms the cavity;
   (b) a motor for moving the punch member to and from the mold along a substantially vertical straight axis, said motor located eccentrically with respect to said straight axis; and
   (c) a transmission means interposed between said motor and the punch member, said transmission means comprising:
      (i) a transmission gear driven by said motor and rotating about an axis parallel to said straight axis;
      (ii) a screw-nut screw rotary-to-linear motion conversion means interconnected to said transmission gear; and
      (iii) an angular connecting means extending in a direction parallel to said straight axis, wherein said angular connection means interconnects said screw-nut screw rotary-to-linear motion conversion means to said transmission gear.

10. The punch assembly as claimed in claim 9, wherein said angular connecting means comprises releasable, longitudinal-toothed connecting means.

11. The punch assembly as claimed in claim 9, wherein said transmission gear is coaxial with said straight axis; and wherein said angular connecting means comprises at least one axial retaining seat carried by one of either said transmission gear and said motion conversion means, and at least one projection carried by another of either said transmission gear and said motion conversion means and engaging said seat in an angular fixed, axially sliding manner.

12. The punch assembly as claimed in claim 9, wherein said transmission gear meshes directly with a gear fitted to an output shaft of said motor.

13. The punch assembly as claimed in claim 9, wherein said transmission gear comprises a ring gear driven by said motor and rotating about a rotation axis parallel to and spaced transversely apart from said straight axis; and a plurality of planet gears meshing with said ring gear and activating said motion conversion means.

14. The punch assembly as claimed in claim 13, wherein said motion conversion means comprise, for each of said plurality of planet gears, a respective motion conversion assembly distinct from motion conversion assemblies of a remainder of said plurality of planet gears.

15. The punch assembly as claimed in claim 14, wherein each said plurality of planet gears is a straight-toothed gear and is fitted to a bottom end portion of a respective externally threaded rod parallel to said axes and connected to a relative nut screw; said punch member being carried by a slide sliding along said rotation axis; and said nut screws being connected integrally to said slide.

16. The punch assembly as claimed in claim 15, wherein said rods extend eccentrically with respect to any one of said axes, and all on the same side of a vertical plane through said straight axis.

17. The punch assembly as claimed in claim 16, wherein said rods extend through respective vertices of a triangle, one side of which is parallel to and spaced apart from said vertical plane.

18. The punch assembly as claimed in claim 13, wherein said ring gear is an internal ring gear formed on a bottom end portion of a tubular body coaxial with said rotation axis and extending through said motor; said tubular body at least partly housing said rods and said slide.

19. The punch assembly as claimed in claim 13, wherein said transmission gear is directly connected to a rotating part of said motor.

* * * * *